(12) United States Patent
Criscione, II et al.

(10) Patent No.: US 8,864,558 B2
(45) Date of Patent: Oct. 21, 2014

(54) REMOVABLE BREAK-AWAY SHACKLE ASSEMBLY

(75) Inventors: Frank J. Criscione, II, Kansas, MO (US); Oliver Hahn, Parkville, MO (US); Ronnie Lee Avey, Gladstone, MO (US); William Randall Armstrong, Kansas City, MO (US)

(73) Assignee: Baader Linco, Inc., Kansas City, KS (US)

( * ) Notice: Subject to any disclaimer, the term of this patent is extended or adjusted under 35 U.S.C. 154(b) by 211 days.

(21) Appl. No.: 13/536,913

(22) Filed: Jun. 28, 2012

(65) Prior Publication Data

US 2013/0017773 A1 Jan. 17, 2013

Related U.S. Application Data

(60) Provisional application No. 61/507,911, filed on Jul. 14, 2011.

(51) Int. Cl.
*A22C 21/00* (2006.01)

(52) U.S. Cl.
CPC .................................. *A22C 21/0007* (2013.01)
USPC .......................................................... 452/188

(58) Field of Classification Search
CPC ........................... A22C 21/0007; B65G 47/61
USPC ........ 198/687.1, 680; 452/185, 187–193, 198
See application file for complete search history.

(56) References Cited

U.S. PATENT DOCUMENTS

| | | | | |
|---|---|---|---|---|
| 2,697,246 A | * | 12/1954 | Zebarth | 452/188 |
| 2,731,665 A | * | 1/1956 | Zebarth | 452/188 |
| 3,854,689 A | * | 12/1974 | Engels | 248/340 |
| 4,372,009 A | * | 2/1983 | Linville | 452/183 |
| 4,413,376 A | * | 11/1983 | Linville | 452/183 |
| 5,875,738 A | * | 3/1999 | Hazenbroek et al. | 119/716 |
| 6,830,508 B2 | * | 12/2004 | Hazenbroek et al. | 452/188 |
| 2003/0124965 A1 | | 7/2003 | Criscione, II et al. | |

FOREIGN PATENT DOCUMENTS

WO 2007117729 10/2007

OTHER PUBLICATIONS

Office Action dated Nov. 19, 2012, issued by European Patent Office, in corresponding EP 12176003.7.

* cited by examiner

*Primary Examiner* — Richard Price, Jr.
(74) *Attorney, Agent, or Firm* — Spencer Fane Britt & Browne LLP

(57) ABSTRACT

A removable break-away shackle assembly for suspending an animal carcass during processing includes a shackle connected to a drop rod, where the drop rod is connected to a conveyor system. The drop rod includes an elongated body with a connector at one end. The shackle includes bendable opposing arms forming a widenable gap. The shackle is separable from the drop rod by passing the drop rod through the widenable gap causing the arms to bend and the gap to widen, or by passing the widenable gap across a depression in the drop rod.

12 Claims, 11 Drawing Sheets

REMOVABLE BREAK-AWAY SHACKLE ASSEMBLY

CROSS-REFERENCE TO RELATED APPLICATIONS

This application claims priority in U.S. Provisional Application No. 61/507,911, filed Jul. 14, 2011, which is incorporated herein by reference in its entirety.

BACKGROUND

The present disclosed subject matter relates generally to a suspension device, and in particular an apparatus connecting a removable break-away shackle assembly to a conveyor system used in processing animal carcasses.

The processing of animal carcasses for consumption, including poultry carcasses, is a highly automated process conducted at a high rate of speed whereby many of the operations are performed by various machines located at processing stations. Movement of the carcasses is by way of an overhead conveyor system. The carcasses typically freely hang from a shackle assembly that is connected to the conveyor system. The shackle assembly generally includes a shackle and a suspension device that is connected to the conveyor system. The suspension device and the shackle may be independent thereby providing an indirect connection between the shackle and the conveyor system.

Shackle assemblies can become worn or damaged during use, or shackles can become separated from a suspension device, requiring replacement. As the carcasses move through the processing operation and the machines interact with them, the shackle and suspension device rotate and swing below the conveyor system causing the carcass or shackle to contact or become entangled with components of the processing machines or transportation system. If a shackle becomes entangled, it may separate from its suspension device as the conveyor system continues to advance through the processing operation, leaving the suspension device connected to the conveyor system, or the shackle assembly as a whole may separate from the conveyor system. Damaged or worn shackles and shackle assemblies need to be removed from conveyor system and replaced with minimal interruption to the moving conveyor system. In addition, suspension devices without shackles need to have new shackles reattached to the conveyor system with minimal disruption to the processing operation. Typically the conveyor system, and in turn the processing operation, must be stopped to remove or attach the shackles to the suspension device. Because conveyor systems can run great lengths, and instances of worn, damaged, or separated shackles or shackle assemblies can be frequent, interruptions of processing operations due to problems with shackles or shackle assemblies can be costly and time consuming.

Heretofore there has not been available a shackle assembly with the advantages and features of the disclosed subject matter.

SUMMARY

A removable break-away shackle assembly for suspending an animal carcass during processing includes a shackle connected to a drop rod. The drop rod has an elongated body with a circular cross-sectional area extending between a hook at a top end for connecting to a moving conveyor system, and a hook at a bottom end for connecting to the shackle. The shackle has bendable opposing arms at an upper portion that form a widenable gap, and openings at a lower portion for retaining the carcass of an animal, such as poultry. The widenable gap is smaller than the maximum circular cross-sectional dimension of the drop rod allowing the shackle to remain connected to the shackle when the animal carcass is being processed, but is capable of deforming when sufficient force is applied to separate the shackle and drop rod, such as when the carcass or shackle become entangled with components of the processing machines or conveyor system. The hook at the bottom end of the drop rod has a depression having a generally oblong cross-sectional dimension whereby the cross-sectional length is greater than the cross-sectional width. The gap is dimensioned to pass over the cross-sectional width of the reduced portion with minimal force thereby allowing the shackle to be selectively removed or attached to the drop rod when the shackle is aligned with the cross-sectional length of the reduced portion.

An alternative embodiment removable break-away shackle assembly includes a drop rod with resilient C-shaped connector at the bottom end forming an opening for connecting to a shackle with a tubular body having an opening in the upper portion. The width of the connector opening is smaller than the maximum cross-sectional width of the opening in the upper portion. However, the opening is widenable allowing the shackle to be removed or attached to the drop rod.

Another alternative embodiment removable break-away shackle assembly includes a resilient C-shaped clip forming a passage mounted to the conveyor system for connecting a drop rod having a circular cross-sectional area. The width of the passage is smaller than the maximum cross-sectional width of the drop rod. However, the passage is widenable allowing the drop rod to be removed or attached to the conveyor system.

BRIEF DESCRIPTION OF THE DRAWINGS

The drawings constitute a part of this specification and include exemplary embodiments of the disclosed subject matter, and illustrate various objects and features thereof.

DETAILED DESCRIPTION

Figure 1:
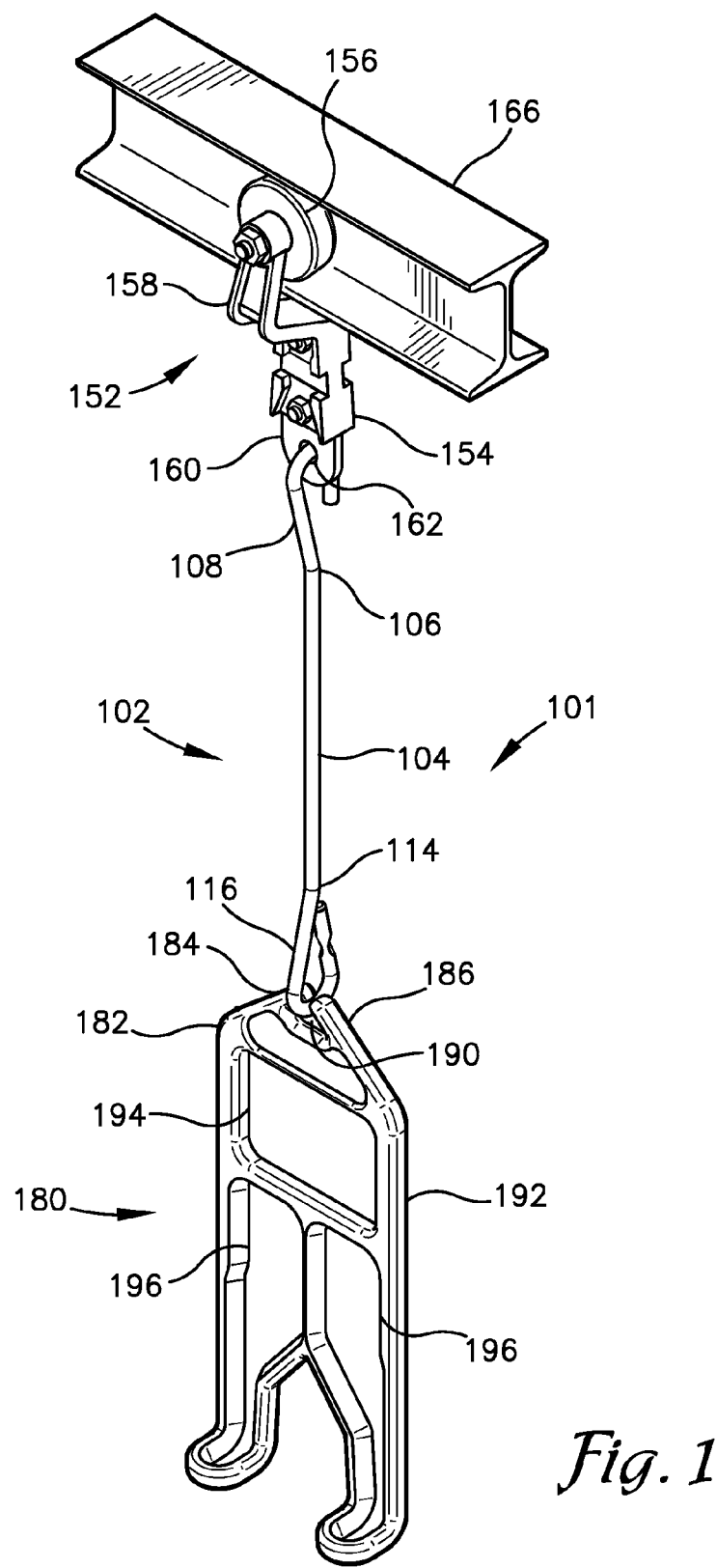
FIG. 1 is a perspective view of a removable break-away shackle assembly embodying principles of the disclosed subject matter.
Figure 2:
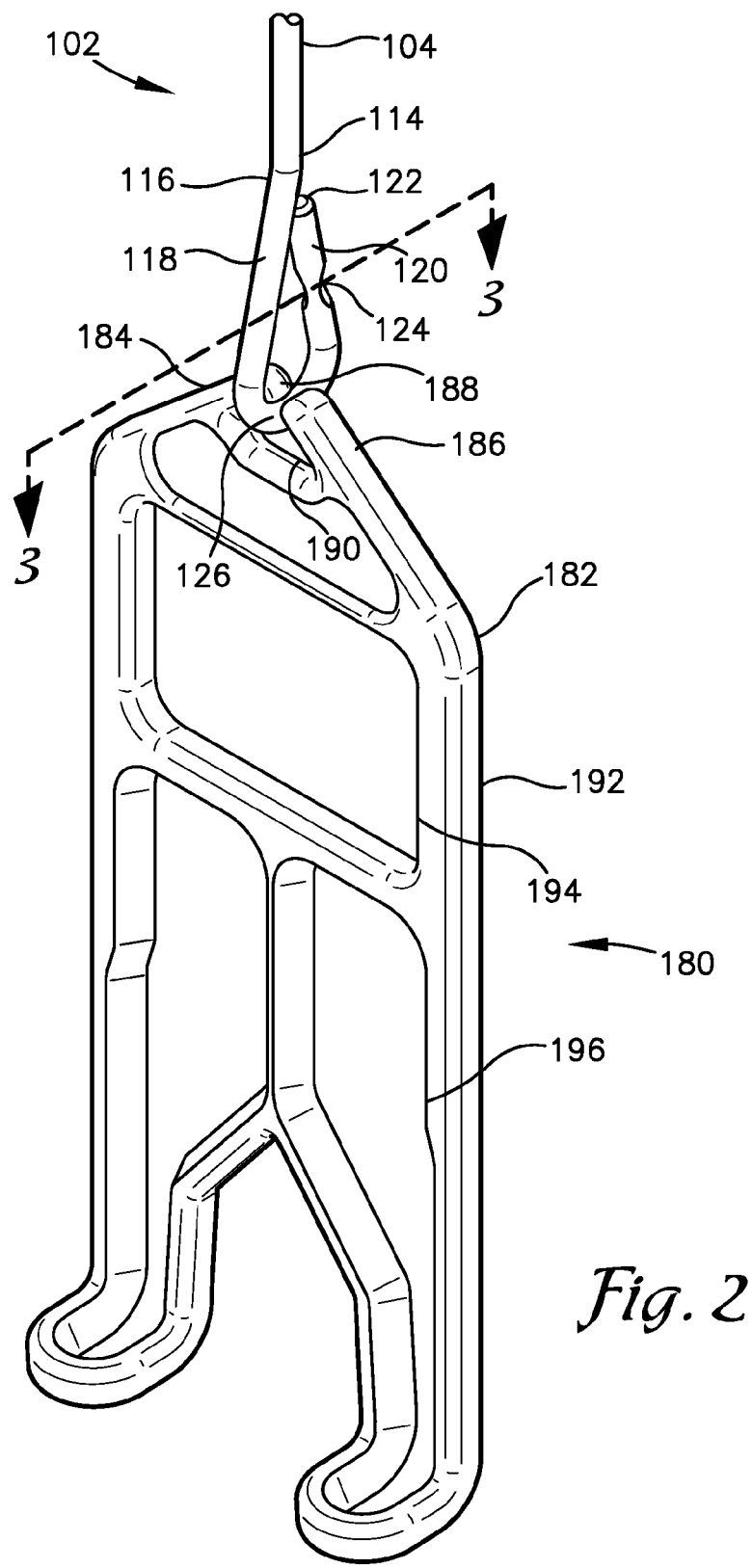
FIG. 2 is an enlarged perspective view of the drop rod and shackle interface.

Detailed aspects of the disclosed subject matter are described herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description for convenience in reference only and will not be limiting. For example, up, down, front, back, left, and right refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof, and words of similar meaning.

Referring to the drawings, FIGS. 1-5 generally show an embodiment of a removable break-away shackle assembly 101 embodying principles of the disclosed subject matter wherein a shackle 180 may be selectively removed or attached to a suspension device, such as a drop rod 102. The shackle 180 is connected to the drop rod 102, and the drop rod 102 is connected to a conveyor system 152. The conveyor system 152 moves the shackle assembly 101 and an animal carcass (not shown) through the processing stations. The drop rod 102 comprises an elongated body 104, extending between a first end 106 having a connector including a hook 108, and a second end 114 having a connector including a loop or hook 116. Without limitation on the generality of useful materials, the drop rod 102 may be made of any number of various materials including metal, plastic, or synthetic polymers, preferably stainless steel. The drop rod 102 may have a cross-sectional dimension comprising cylindrical, angular, or any combination of shapes, preferably cylindrical. The hook 108 at the first end 106 of the drop rod 102 connects to the conveyor system 152.

An embodiment of the conveyor system 152 generally comprises a plurality of trolleys 154 that move upon a track 166. Each trolley 154 has a frame 158 that is mounted to the track 166 by wheels 156. A mount 160 depending from the frame 158 has an aperture 162 for receiving the hook 108 on the drop rod 102. The trolleys 154 are mounted to the track 166 in a spaced relationship permitting a plurality of shackle assemblies 101 to freely hang below.

In an embodiment, the drop rod 102 is used with a shackle 180 having an upper portion 182 comprising bendable first 184 and second 186 arms forming an opening 190 and a widenable gap 188. Without limitation on the generality of useful materials, the shackle 180 may be made of any number of various materials including metal, plastic, or synthetic polymers, preferably nylon. The lower portion 192 of the shackle 180 comprises one or more upper and lower openings 194, 196 for providing support to the shackle 180 and for mounting and retaining the poultry carcasses thereto. The gap 188 is smaller than the maximum cross-sectional width of the drop rod 102, except with respect to a depression 124, described in more detail below. However, given the resilient properties of the materials comprising the shackle 180, and the bendable conformation of the arms 184 and 186, the gap 188 is widenable enabling the shackle 180 to be securely attached to the drop rod 102, but separable under a pre-established condition if a sufficient amount of force is applied between the shackle 180 and drop rod 102 causing the drop rod 102 to pass through the arms 184 and 186 and the gap 188 to widen. In an embodiment, the pre-established condition includes an increase in a downward force upon the shackle 180 including when the shackle 180 becomes caught on a machine or otherwise impeded. In another embodiment, the amount of force to separate the shackle 180 from the drop rod 102 is approximately between 150 pounds and 250 pounds. Depending upon the size or weight of the carcass the separation force may be higher or lower.

The hook 116 on the second end 114 of the drop rod 102 is a closed hook having a generally triangular shape comprising a first lateral 118 and second lateral 120 connected by a base 126. The second lateral 120 has a terminal end 122 that is in close proximity to the body 104 and may be unsecured to the body, or alternatively connected to the body 104 for providing greater strength to the hook 116. The second lateral 120 has a depression 124 located between the base 126 and terminal end 122 that compliments the gap 188 on the shackle 180. The depression 124 may optionally be located on the first lateral 118.

Figure 3:
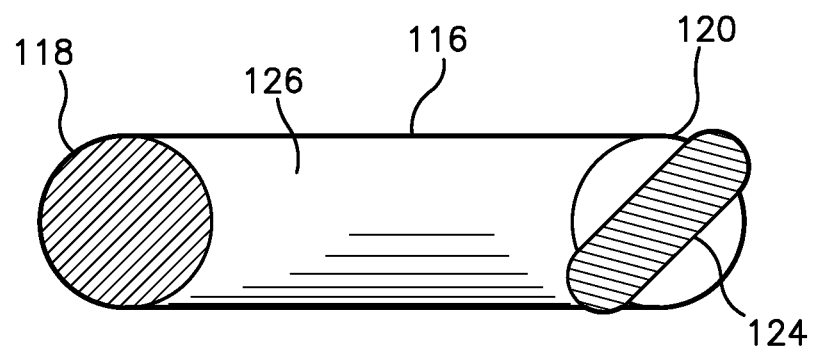
FIG. 3 is a cross-sectional view of the hook taken along line 3-3 in FIG. 2.
Figure 4:
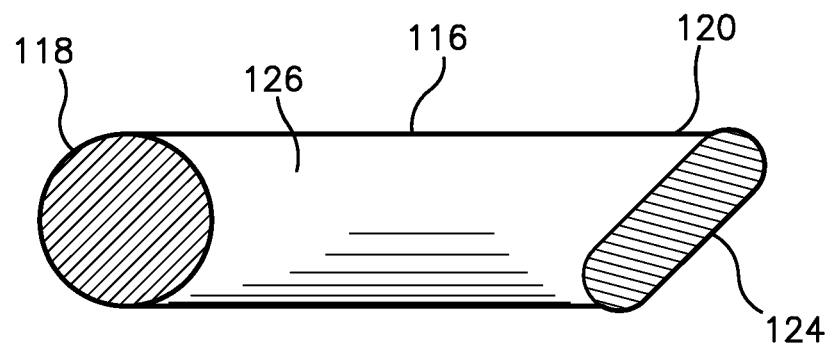
FIG. 4 is a cross-sectional view of an alternative embodiment hook.

The depression 124 has a generally oblong cross-section whereby the cross-sectional length is greater than the cross-sectional width. The depression 124 is formed by deforming a portion of the second lateral 120 to create an oblong cross-sectional dimension (FIG. 3). Alternatively, the depression 124 is formed by removing material from the second lateral 120 to create the oblong cross-sectional area having scalloped sides (FIG. 4). The cross-sectional width of the reduced portion 124 is substantially similar to the width of the gap 188 in the shackle 180. The hook 116 and second end 114 generally lie in a plane. The cross-sectional length of the depression 124 is orientated generally at a forty-five degree angle with respect to the plane of the hook 116. The gap 188 is dimensioned to pass over the cross-sectional width of the depression 124 with slight force thereby allowing the shackle 180 to be removed or attached to the drop rod 102 when the shackle 180 is aligned with the cross-sectional length of the depression 124.

In operation, the shackle assembly 101 travels along the conveyor system 152 enabling the carcass hanging from it to interact with the processing machines during the processing operation. During normal operation, the shackle 180 and drop rod 102 rotate and swing about each other, and the shackle 180 and drop rod 102 will remain connected because the depression of the gap 188 is smaller than the cross-sectional width of the first lateral 118 and base 126. Except as described below, the gap 188 is smaller than the cross-sectional dimension of the majority of the second lateral 120, and will remain connected to the drop rod 102. However, as described above, the shackle 180 may separate from the drop rod 102 if a sufficient amount of force is applied between the shackle 180 and drop rod 102 causing the gap 188 to widen, such as when the carcass or shackle 180 becomes entangled with components of the processing machines or transportation system as the conveyor system 152 continues to advance through the processing operation.

Figure 5:
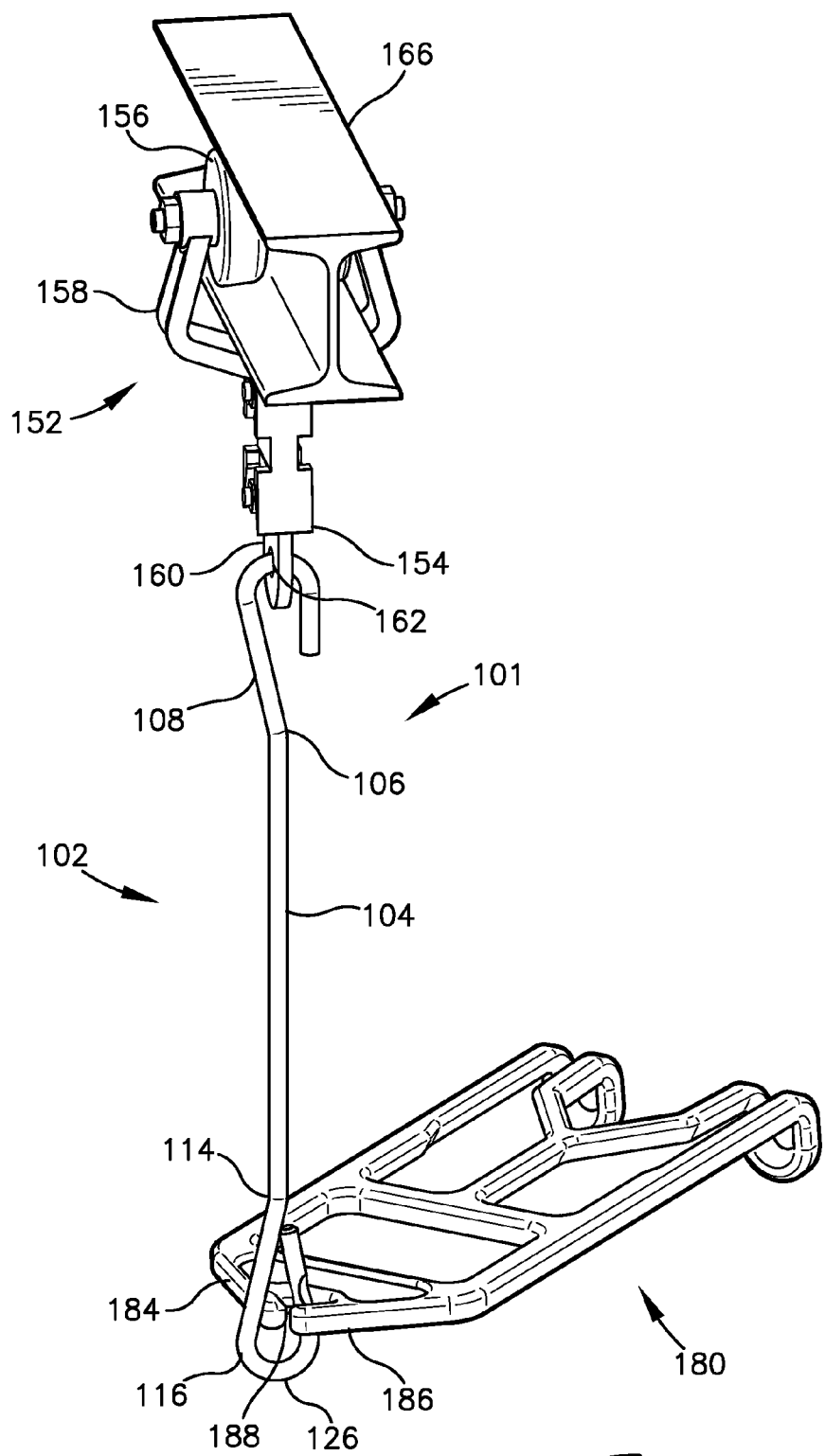
FIG. 5 is perspective view of the drop rod and shackle prior to removal.
Figure 6:
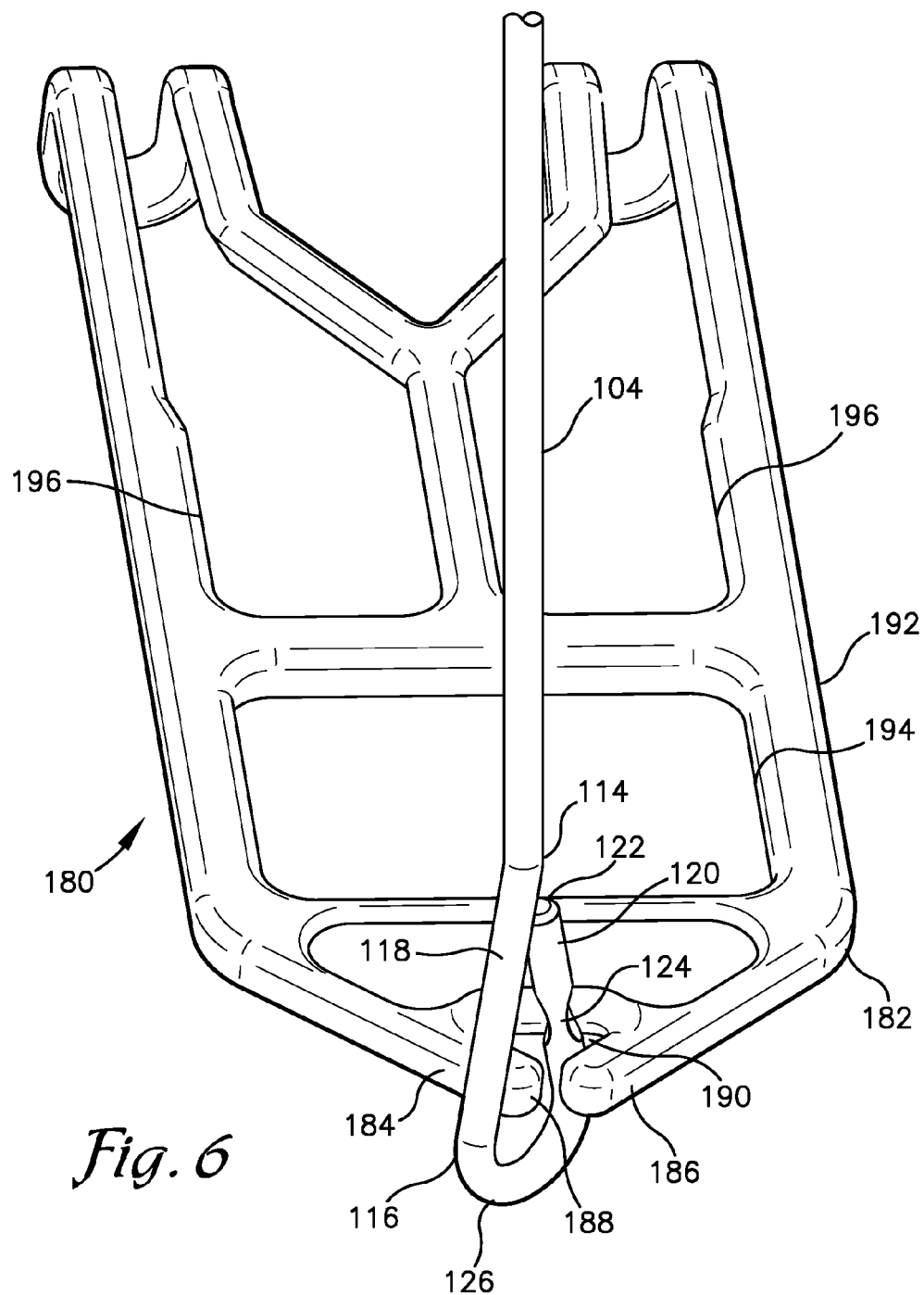
FIG. 6 is an enlarged perspective view of the drop rod and shackle interface.
Figure 7:
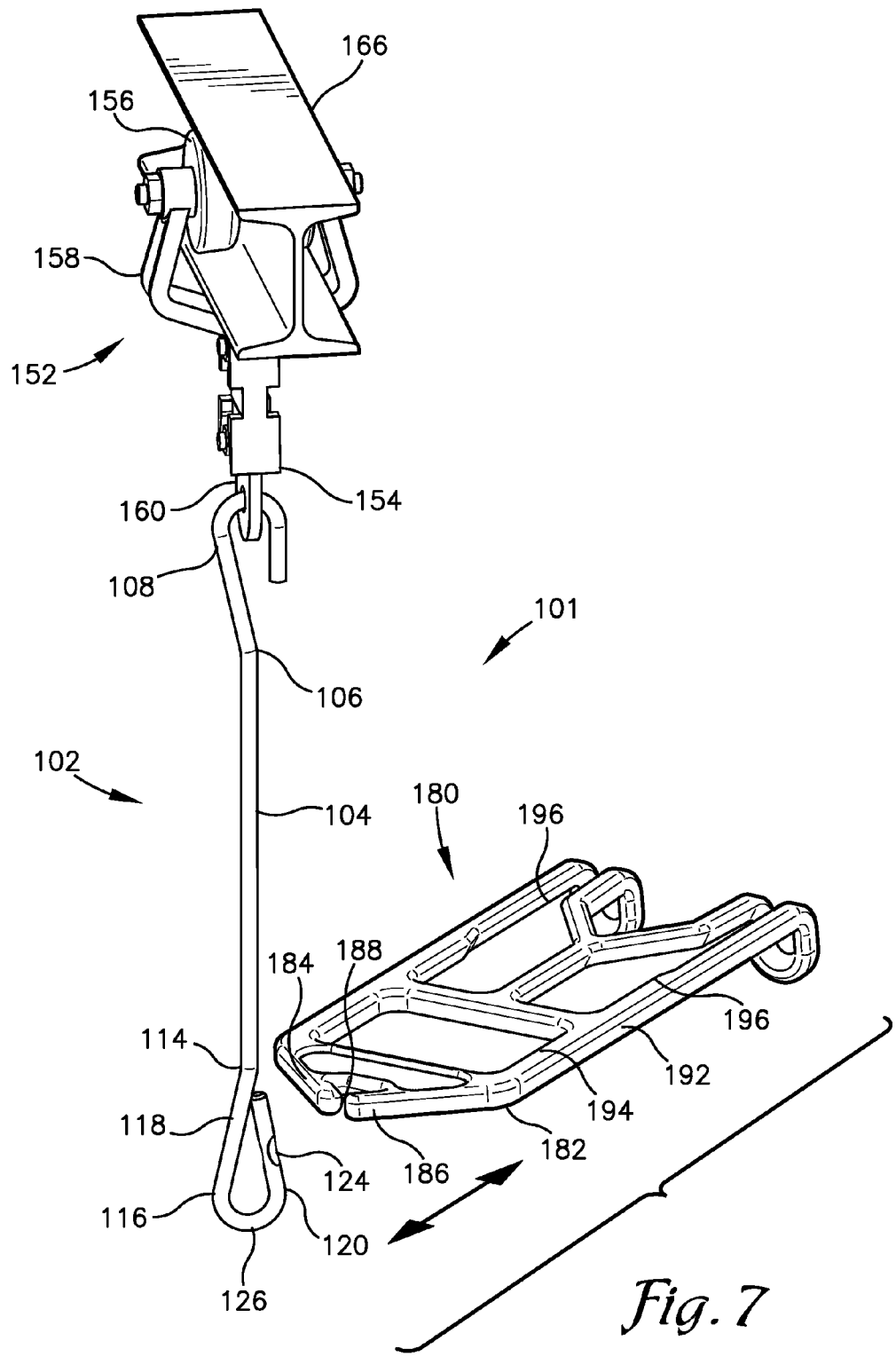
FIG. 7 is a perspective view of the shackle removed from the drop rod.

If a shackle 180 needs to be removed from a drop rod 102, the body of the shackle 180 can be moved into a specific position relative to the drop rod 102 permitting the two to be separated with minimal force. The shackle 180 is rotated toward the second lateral 120 such that the shackle 180 is generally perpendicular to the drop rod 102, and the upper portion 182 of the shackle 180 is aligned generally parallel with the cross-sectional length of the depression 124 (FIGS. 5-6). Aligning the shackle 180 with the cross-sectional length of the depression 124 permits the gap 188 to pass across the drop rod 102 with slight force permitting selective removal of the shackle 180 from the hook 116 (FIG. 7). In turn, a shackle 180 can be mounted to a drop rod 102 by aligning the upper portion 182 of the shackle 180 with the cross-sectional length of the depression 124 as described above, and passing the gap 188 across the depression 124 onto the hook 116.

Figure 8:
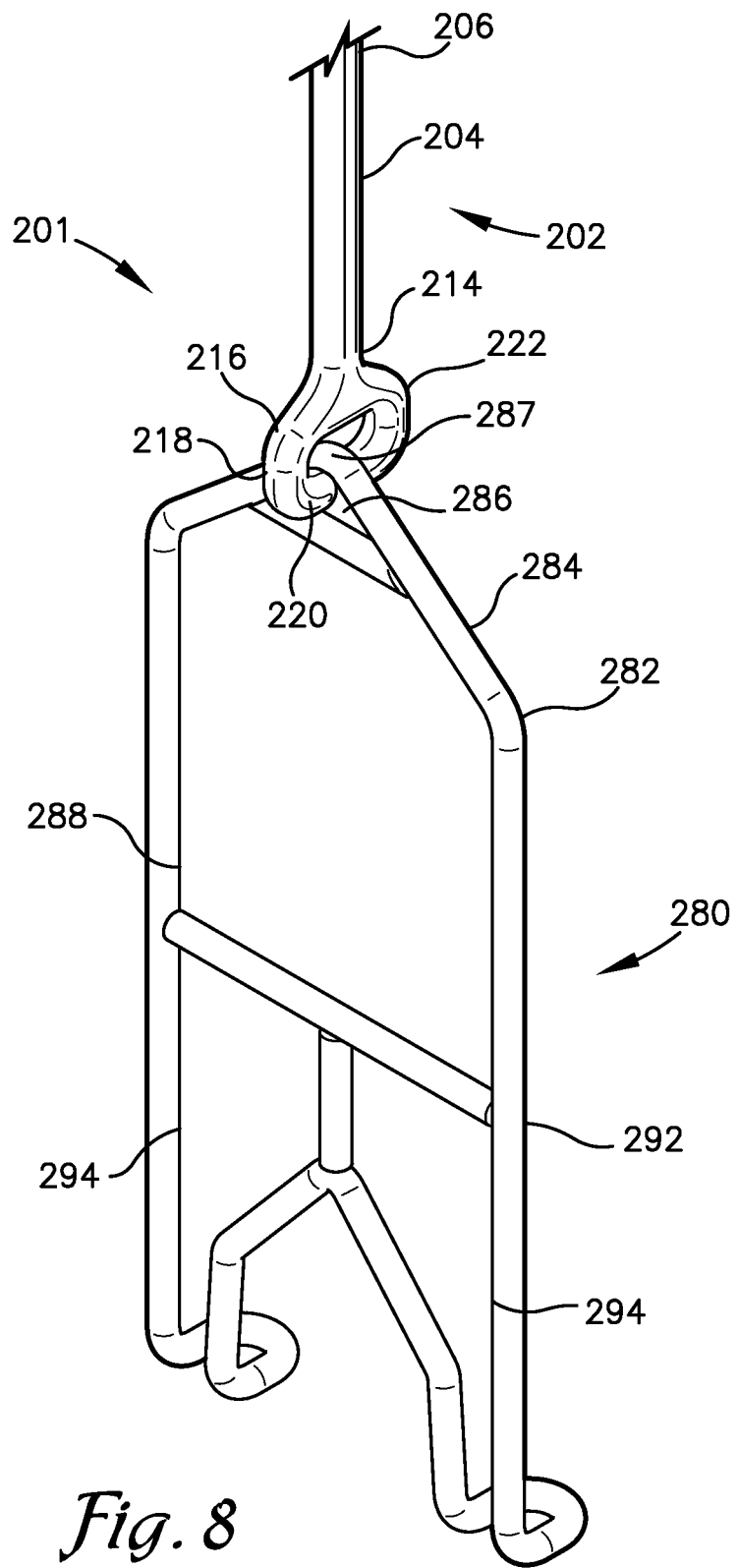
FIG. 8 is a perspective view of an alternative embodiment removable break-away shackle assembly embodying principles of the disclosed subject matter.
Figure 9:
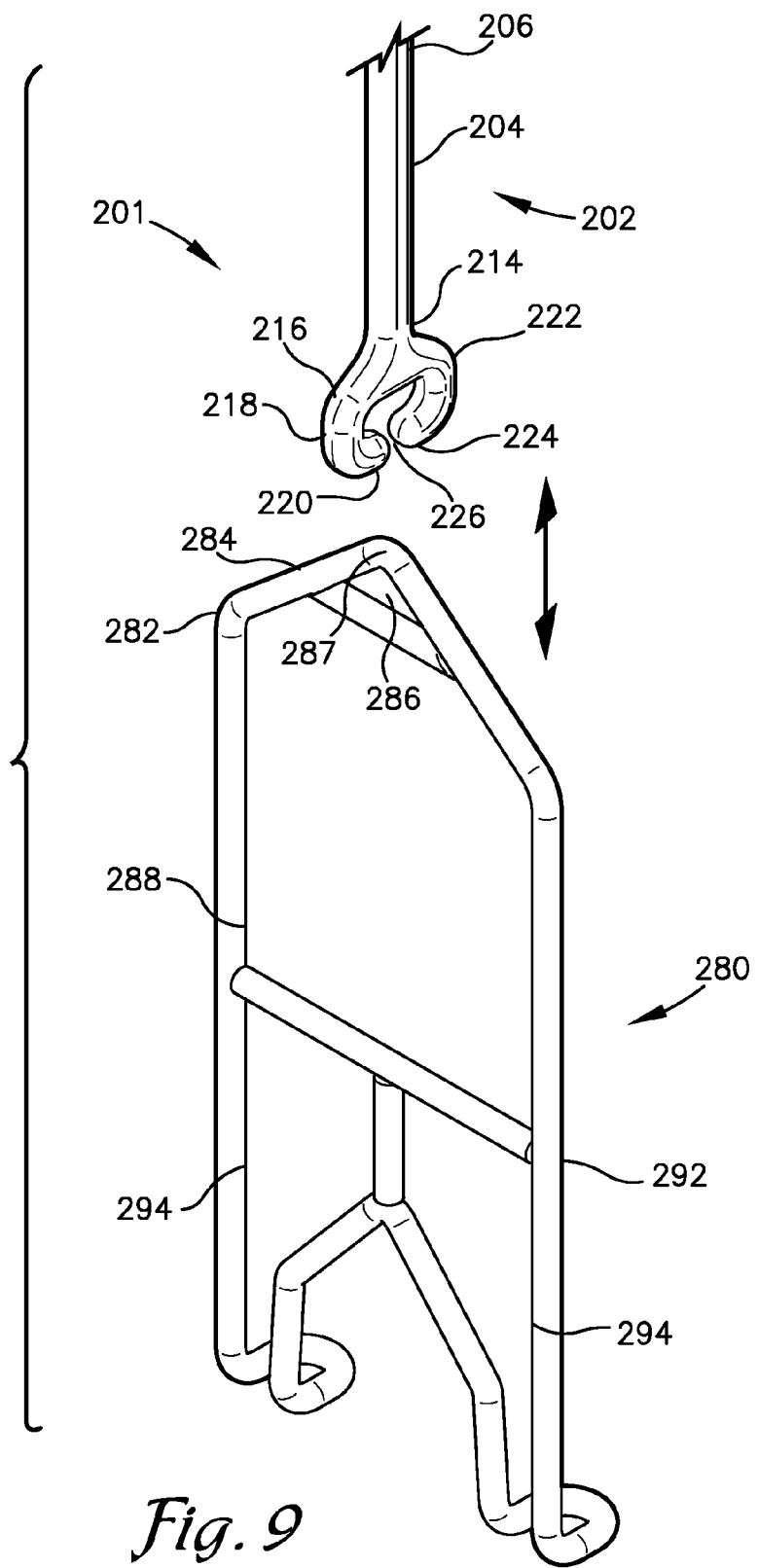
FIG. 9 is a perspective view of the shackle removed from the drop rod.

Referring to FIGS. 8-9, an alternative embodiment of a removable break-away shackle assembly 201 embodying principles of the disclosed subject matter is shown including a shackle 280 that is selectively removed or attached to a drop rod 202. The shackle 280 is connected to the drop rod 202, and the drop rod 202 is connected to the conveyor system 152. The drop rod 202 comprises an elongated body 204, extending between a first end 206 including a connector for connecting to the conveyor, and a second end 214 having a resilient C-shaped connector 216. Without limitation on the generality of useful materials, the drop rod 202 may be made of any number of various materials including metal, plastic, or synthetic polymers, preferably nylon.

In an embodiment, the drop rod 202 is used with a shackle 280 having a frame 282 with an upper portion 284 and a lower portion 292. In an embodiment, the frame 282 is comprised of structural elements including elongated cylindrical elements having a circular cross-sectional area connected together. The upper portion 284 includes an upper opening 286 having a nose 287 with a circular cross-sectional width for connecting to the drop rod 202, and a lower opening 288 for providing support to the frame 282. The lower portion 292 comprises one or more openings 294 for providing support to the frame 282 and for mounting and retaining the poultry carcasses thereto.

In an embodiment, the connector 216 of drop rod 202 has a generally rectangular shape comprising opposing bendable first and second legs 218 and 222, each having a foot 220 and 224, respectively, defining an opening 226 having a width. Given the resilient properties of the materials comprising the connector 216, and the bendable conformation of the legs 218, 222, and feet 220, 224, the width of the opening 226 is widenable enabling the connector 216 to be securely attached to the shackle 280 and separated from the shackle 280 if a sufficient amount of force is applied between the shackle 280 and drop rod 202 causing the opening 226 to widen. In an embodiment, the pre-established condition includes an increase in a downward force upon the shackle 280 including when the shackle 280 becomes caught on a machine or otherwise impeded. In another embodiment, the amount of force to separate the shackle 280 from the drop rod 202 is approximately between 150 pounds and 250 pounds. Depending upon the size or weight of the carcass the separation force may be higher or lower. As such, the width of the opening 226 is smaller than the maximum cross-sectional dimension of the nose 287.

In normal use, the shackle 280 and drop rod 202 rotate and swing about each other, and the shackle 280 and drop rod 202 will remain connected because the width of the opening 226 is smaller than the maximum cross-sectional width of the upper opening 286. However, the shackle 280 may separate from the drop rod 202 if a sufficient amount of force is applied between the shackle 280 and drop rod 202 causing the opening 226 to widen, such as when the carcass or shackle 280 becomes entangled with components of the processing machines or transportation system as the conveyor system 152 continues to advance through the processing operation.

If a shackle 280 needs to be removed from the drop rod 202, the two can be separated. In turn, a shackle 280 can be mounted to the drop rod 202 by passing the upper portion 284 through the opening 226.

Figure 10:
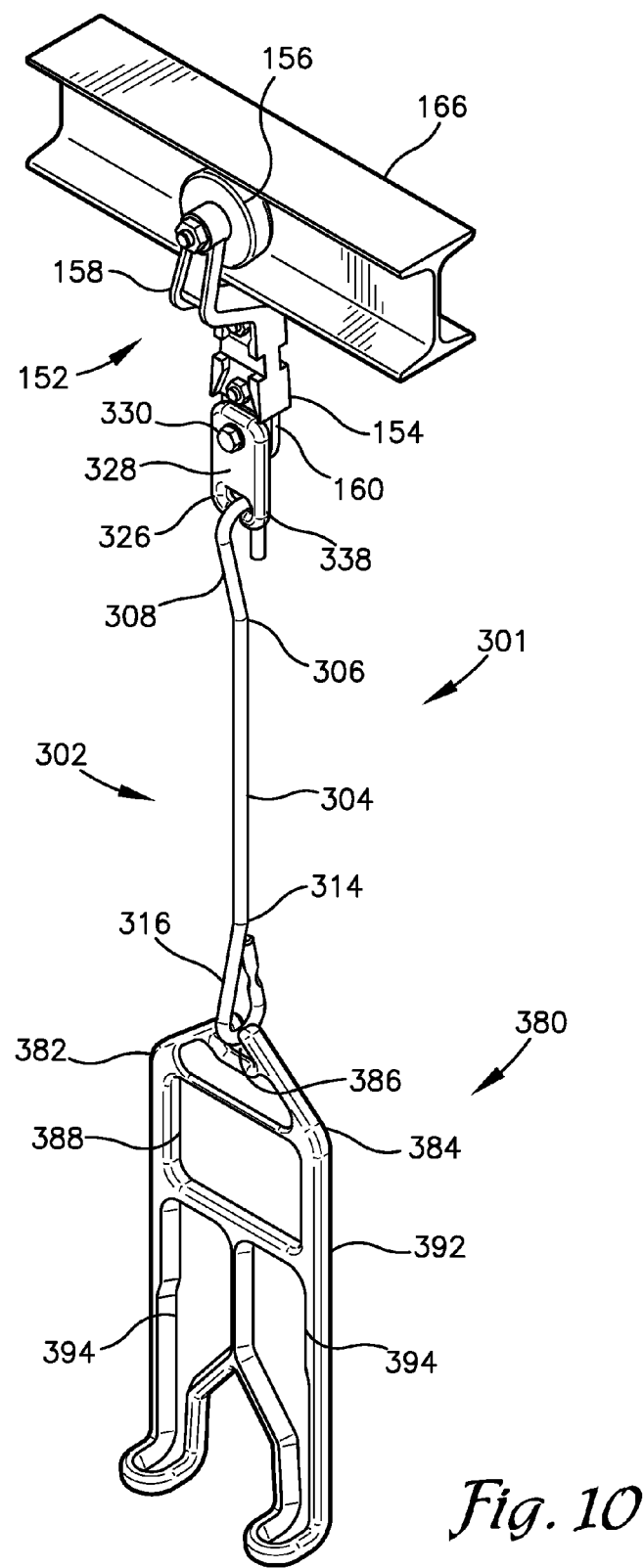
FIG. 10 is a perspective view of an alternative embodiment removable break-away shackle assembly embodying principles of the disclosed subject matter.
Figure 11:
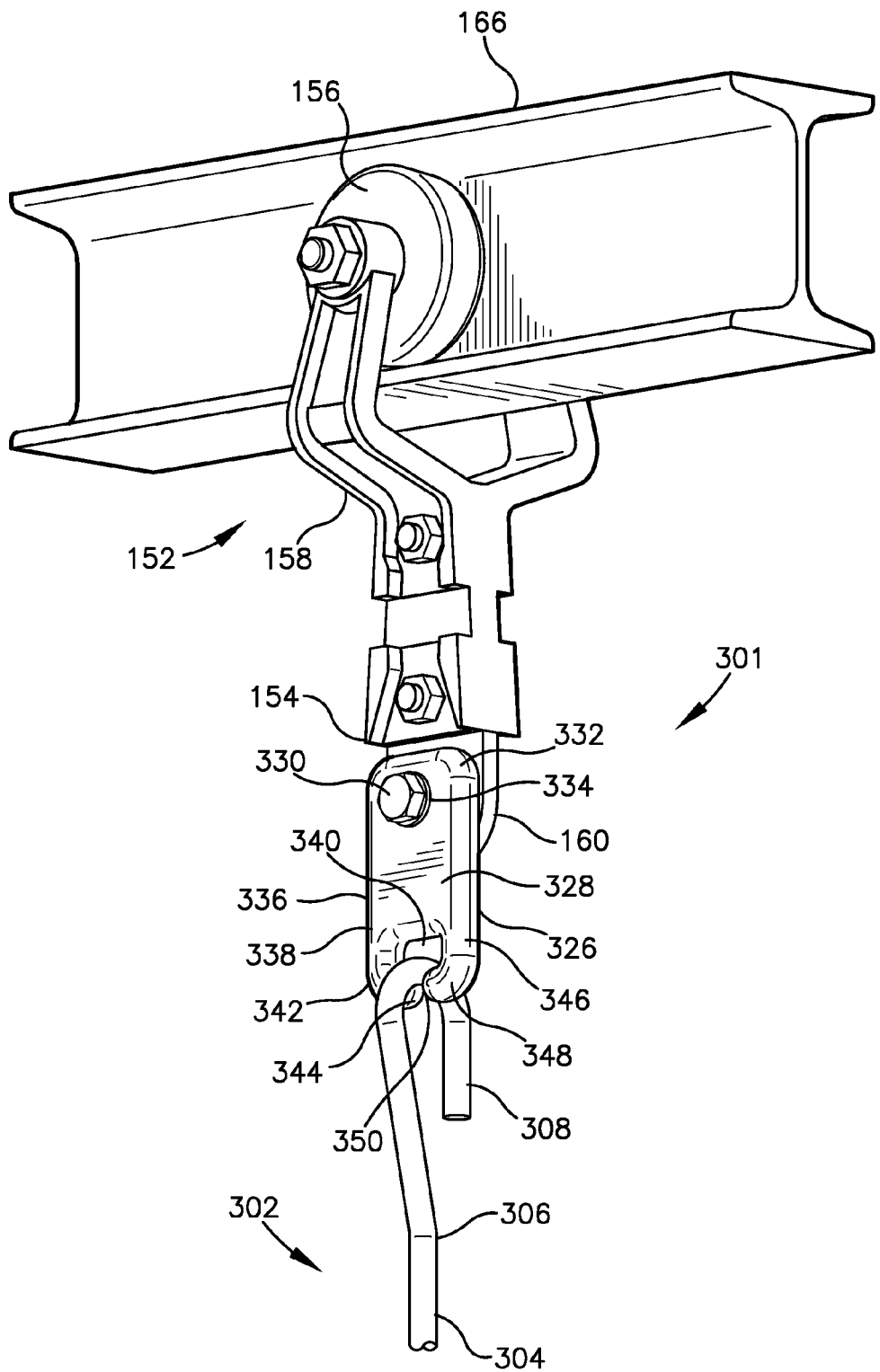
FIG. 11 is an enlarged perspective view of the drop rod and clip interface.
Figure 12:
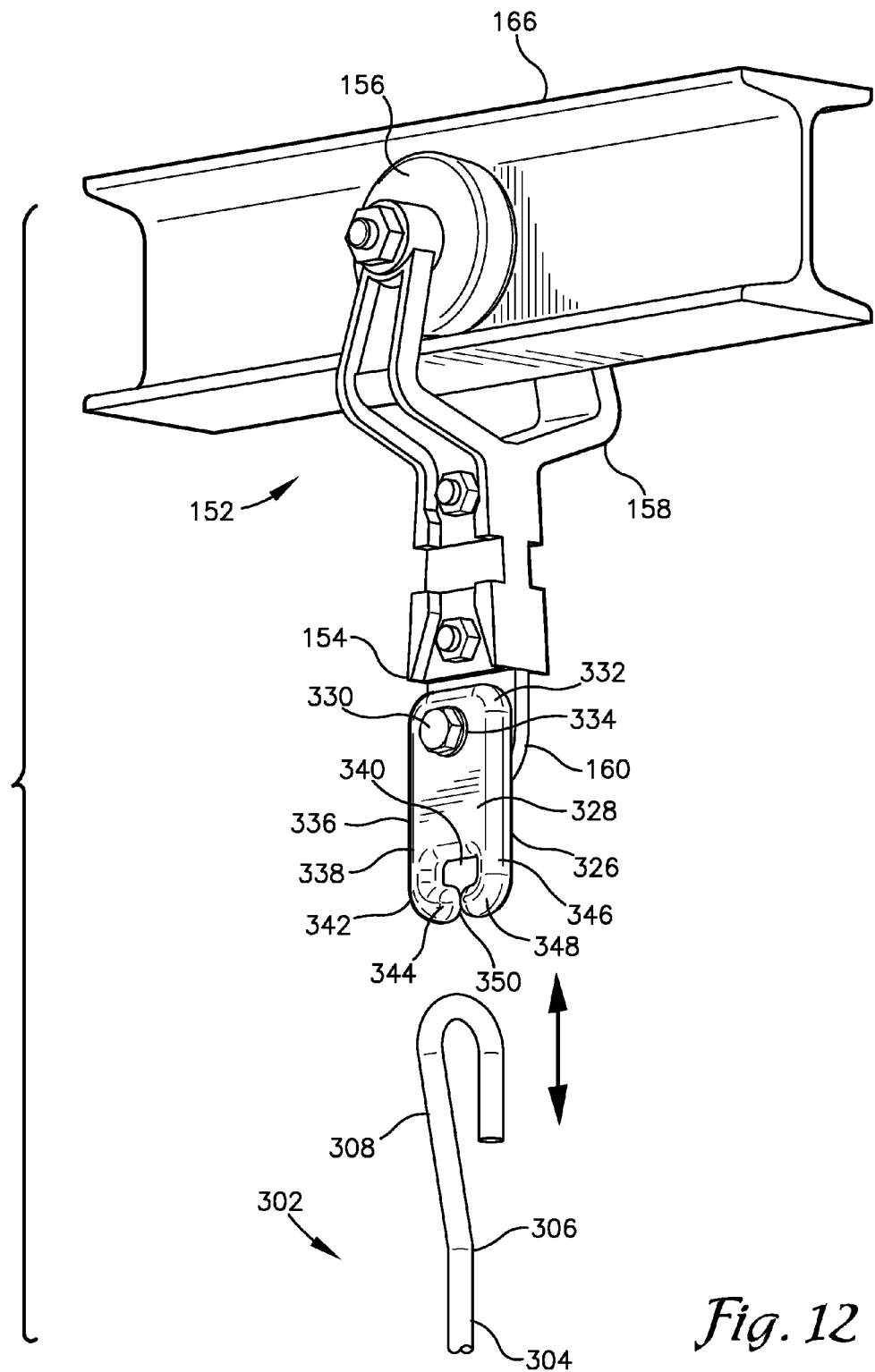
FIG. 12 is a perspective view of the drop rod removed from the clip.

Referring to FIGS. 10-12, an alternative embodiment of a removable break-away shackle assembly 301 embodying principles of the disclosed subject matter is shown wherein a drop rod 302 is selectively removed or attached to a clip 326. A shackle 380 is connected to the drop rod 302, the drop rod 302 is removably connected to the clip 326, and the clip 326 is connected to the conveyor system 152.

The drop rod 302 comprises an elongated body 304, extending between a first end 306 having a connector including a hook 308, and a second end 314 having a connector including a loop or hook 316. Without limitation on the generality of useful materials, the drop rod 302 may be made of any number of various materials including metal, plastic, or synthetic polymers, preferably stainless steel. The drop rod 302 may have a cross-sectional dimension comprising cylindrical, angular, or any combination of shapes, preferably cylindrical with a circular cross-sectional width. The hook 308 at the first end 306 of the drop rod 302 connects to the clip 326. In an embodiment, the drop rod 302 is used with a shackle 380 having a frame 382 with an upper portion 384 and a lower portion 392. The upper portion 384 includes an upper opening 386 for connecting to the drop rod 302, and a lower opening 388 for providing support to the frame 382. The lower portion 392 comprises one or more openings 394 for providing support to the frame 382 and for mounting and retaining the poultry carcasses thereto.

The drop rod 302 first end 306 hook 308 is an open hook adapted for insertion into the opening 340 in the clip 326. The hook 308 has a circular cross-section whereby the maximum cross-sectional width is greater than the passage 350 in the clip 328. The drop rod 302 second end 314 hook 316 extends through the upper opening 386 of the shackle 380 and is a closed hook whereby the end of the hook 316 is drawn into close proximity to the body 304.

The clip 326 has a generally rectangular shaped body 328 extending between a first end 332 having an aperture 334, and a second end 336 having a resilient C-shaped connector 338. Without limitation on the generality of useful materials, the clip 328 may be manufactured from any number of various materials including metal, plastic, or synthetic polymers, preferably nylon. The aperture 334 is adapted to receive a nut and bolt 330 combination. The clip 326 is mounted to the conveyor system 152 by passing the bolt through the aperture 334 in the clip 326, and the aperture 162 in the mount 160 and threadably securing the nut thereto. The C-shaped connector 338 comprises opposite first and second legs 342 and 346, each having a foot 344 and 348, respectively, defining a passage 350 having a width. Given the resilient properties of the materials comprising the clip 326, and the bendable conformation of the legs 342, 346 and feet 344, 348 the passage 350 is widenable enabling the clip 326 and drop rod 302 to separate under pre-established conditions, such as if a sufficient amount of force is applied between the two causing the passage 350 to widen. In an embodiment, the pre-established condition includes an increase in a downward force upon the drop rod 302 including when the drop rod 302 becomes caught on a machine or otherwise impeded. In another embodiment, the amount of force to separate the drop rod 302 from the clip 326 is approximately between 150 pounds and 250 pounds. Depending upon the size or weight of the carcass the separation force may be higher or lower.

In use, the drop rod 302 is mounted to the clip 326 allowing the clip 326, drop rod 302, and shackle 380 to freely rotate and swing about each other. The drop rod 302 and clip 326 will remain connected because the width of the passage 350 is smaller than the maximum cross-sectional width of the hook 308. However, the drop rod 302 may separate from the clip 326 if a sufficient amount of force is applied between the drop rod 302 and clip 326 causing the passage 350 to widen, such as when the carcass or shackle 380 become entangled with components of the processing machines or transportation system as the conveyor system 152 continues to advance through the processing operation.

If a drop rod 302 needs to be removed from the conveyor system 152, for example, because the attached shackle 380 needs to be removed, the drop rod 302 and clip 326 can be separated by withdrawing the hook 308 from the opening 340. In turn, a drop rod 302 can be mounted to the clip 326 by inserting the hook 308 into the opening 340.

It will be appreciated that the components of the shackle assembly 101 can be used for various other applications, and for processing other types of animals. Moreover, the shackle assembly 101 can be fabricated in various sizes and from a wide range of suitable materials, using various manufacturing and fabrication techniques.

Although the invention has been disclosed with reference to various particular embodiments, it is understood that equivalents may be employed and substitutions made herein without departing from the scope of the invention as recited in the claims.

Having thus described the disclosed subject matter, what is claimed is:

1. A shackle assembly for suspending a carcass from a conveyor system, comprising:
    a rod extending between a first end and a second end, wherein:
        the first end is adapted for connection to the conveyor system; and
        the second end includes a connector, and the connector includes a depression having a width;
    a shackle for retaining the carcass, comprising:
        a resilient upper portion connected to the connector, comprising:
            a bendable first arm; and
            an opposing bendable second arm forming a widenable gap having a gap width; and
    wherein the width of the depression is approximately the same as the width of the widenable gap, whereby the widenable gap may pass over the depression thereby allowing the shackle to be removed or attached to the rod.

2. The shackle assembly of claim 1, wherein the connector is a hook.

3. The shackle assembly of claim 1, wherein the connector further includes: a lateral; and the depression is located on the lateral.

4. The shackle assembly of claim 1, wherein the depression has an oblong cross-section.

5. The shackle assembly of claim 1, wherein the depression has a scallop cross-section.

6. The shackle assembly of claim 1, wherein:
    the connector has a cross-sectional width;
    the depression has a cross-sectional width and a cross-sectional length;
    the cross-sectional width of the depression is less than a maximum cross-sectional width of the connector; and
    the depression cross-sectional length is greater than the depression cross-sectional width.

7. The shackle assembly of claim 6, wherein:
    the connector lies in a plane; and
    the depression cross-sectional length is orientated at a forty-five degree angle with respect to the plane.

8. The shackle assembly of claim 1, wherein the widenable gap widens under a pre-established condition thereby disengaging the shackle from the connector.

9. The shackle assembly of claim 8, wherein the pre-established condition is a force applied to the shackle equivalent to approximately between 150 pounds and 250 pounds disengaging the shackle from the rod.

10. A shackle assembly for suspending a carcass from a conveyor system, comprising:
    a shackle for retaining the carcass, comprising:
        a frame having a cross-sectional width; and
        an upper portion including an upper opening;
    a rod extending between a first end and a second end, wherein:
        the first end includes a connector; and
        the second end is connected to the shackle upper portion;
    a clip extending between a first end and a second end, wherein:
        the first end is connected to the conveyor system, and
        the second end includes a resilient portion, the resilient portion including:
            a bendable fist arm; and
            an opposing bendable second arm forming a widenable opening having an opening width; and
    wherein the connector may pass through the widenable opening thereby allowing the rod to be removed or attached to the clip.

11. The shackle assembly of claim 10, wherein the widenable opening widens under a pre-established condition thereby disengaging the rod from the clip.

12. The shackle assembly of claim 11, wherein the pre-established condition is a force applied to the rod equivalent to approximately between 150 pounds and 250 pounds disengaging the rod from the clip

* * * * *